United States Patent
Hall

[15] 3,655,323
[45] Apr. 11, 1972

[54] MOLDING DIE STRUCTURE

[72] Inventor: Leland V. Hall, Riddle, Oreg.
[73] Assignee: Oasis Electronics, Riddle, Oreg.
[22] Filed: Mar. 9, 1970
[21] Appl. No.: 17,379

[52] U.S. Cl..................425/438, 425/DIG. 14, 425/DIG. 58
[51] Int. Cl............................................................B29c 1/06
[58] Field of Search................18/30 WC:DIG. 10, DIG. 19, 18/DIG. 58, DIG. 5, DIG. 14, 45 R; 25/128 K, 128 RR

[56] References Cited

UNITED STATES PATENTS

| | | | |
|---|---|---|---|
| 3,247,548 | 4/1966 | Fields et al. | 18/DIG. 58 |
| 3,279,739 | 10/1966 | Long | 18/45 R X |
| 2,970,343 | 2/1961 | Johnson et al. | 18/45 R |
| 669,279 | 3/1901 | Harrington | 18/DIG. 9 |

FOREIGN PATENTS OR APPLICATIONS

H7309 8/1956 Germany..........................18/30 WC

*Primary Examiner*—H. A. Kilby, Jr.
*Attorney*—Buckhorn, Blore, Klarquist & Sparkman

[57] ABSTRACT

A core to be used for injection molding of or the forming of molded or extruded cylinders whereas they have threaded or otherwise undercut internal surfaces, in which the core die is collapsible enough to allow the molded or extruded part to be ejected from die. The walls of the core are not hinged but are formed from two sleeves which are slotted to form tines or springy segments, all of which are solidly paired together at one end. The segments are locked in place by means of a cam. The cam holds the segments so as to form an extremely solid die wall.

3 Claims, 6 Drawing Figures

LELAND V. HALL
INVENTOR

BY
BUCKHORN, BLORE, KLARQUIST & SPARKMAN
ATTORNEYS

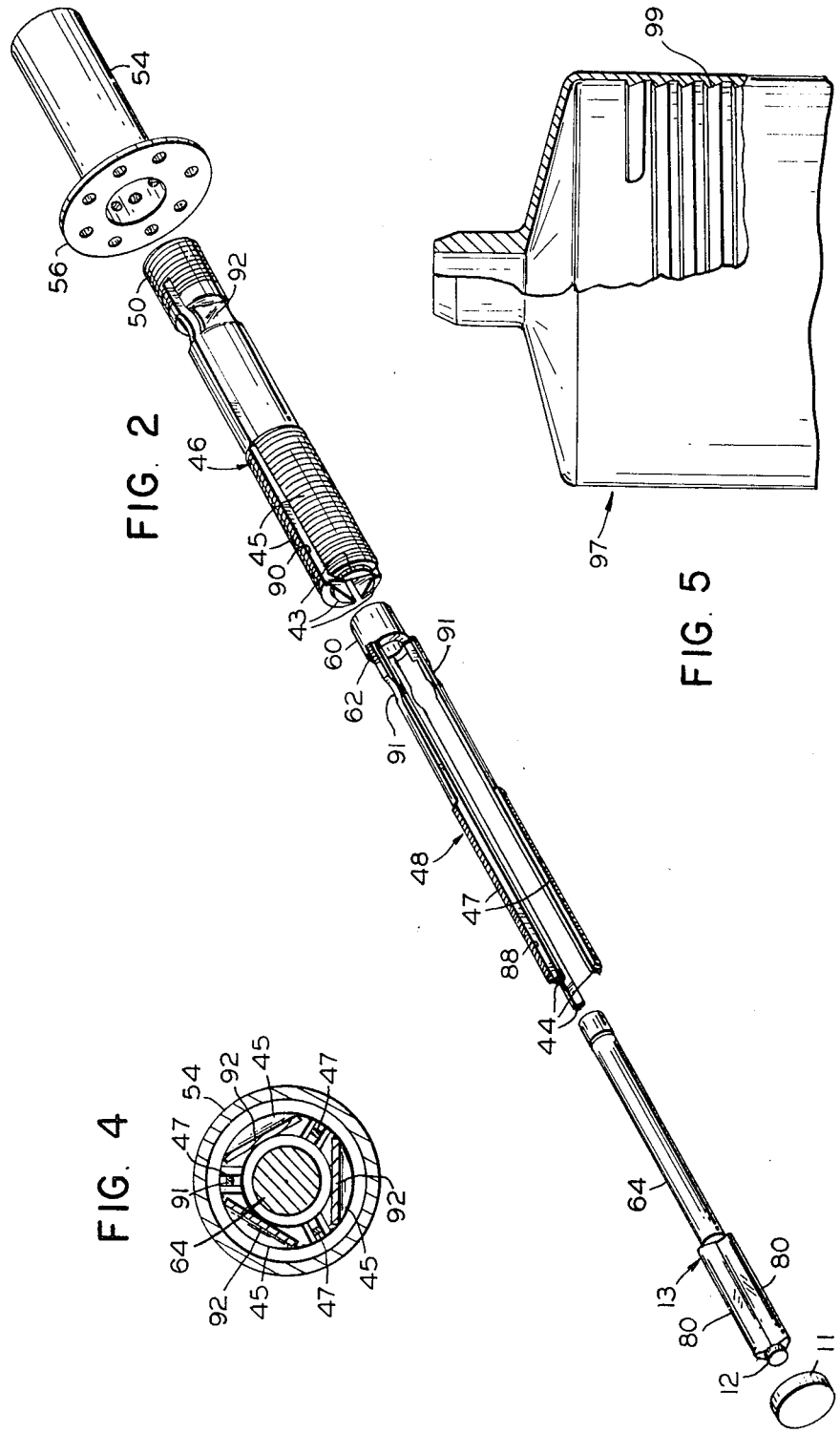

MOLDING DIE STRUCTURE

DESCRIPTION

This invention relates to a molding die structure, and more particularly to a collapsible core.

An object of the invention is to provide an improved molding die structure.

Another object of the invention is to provide an improved collapsible core.

Another object of the invention is to provide a collapsible core having an extremely solid core wall.

A further object of the invention is to provide a collapsible core having tines extended outside a die plate a sufficient distance to allow the tines to collapse without distortion or stress, thus eliminating hinges and thus minimizing the chance of wear or disalignment.

Another object of the invention is to provide a collapsible core having segments which are expanded to working position with a retaining cap, thus minimizing any problem with parting lines on the molded or formed piece.

A further object of the invention is to provide a molding die structure in which a cylinder may be extruded or otherwise placed over the walls of a core and when external pressure is applied to cause said cylinder to conform to the pattern on the core wall. The core can then be collapsed, enabling the core to be removed from said product.

Another object of the invention is to provide a molding die structure having a collapsible core and an adapter plate equipped with a counterbore. A soft cylinder can then be extruded over the core walls, with the extreme end of the cylinder entering said counterbore. Then the core is expanded to working position sealing off the clearance between the extruded end of the cylinder and the counterbore of the adapter plate to allow the use of air pressure to collapse or to make the cylinder conform to the patterned exterior walls of the core, thus allowing the forming of threads or patterns on an open ended cylinder without the use of external dies.

A further object of the invention is to provide a collapsible core in which segment ends of a sleeve are securely held between undercut sections of a cap and a center cam. The other ends of the segments are secured to an adapter plate and a center cam.

In the drawings:

FIG. 2 is an exploded perspective view of a collapsible core of the molding die structure of FIG. 1;

FIG. 4 is an enlarged vertical, sectional view taken along line 4—4 of FIG. 1;

FIG. 5 is a fragmentary, partially sectional view of an article molded by the die structure of FIG. 1.

Figure 1:
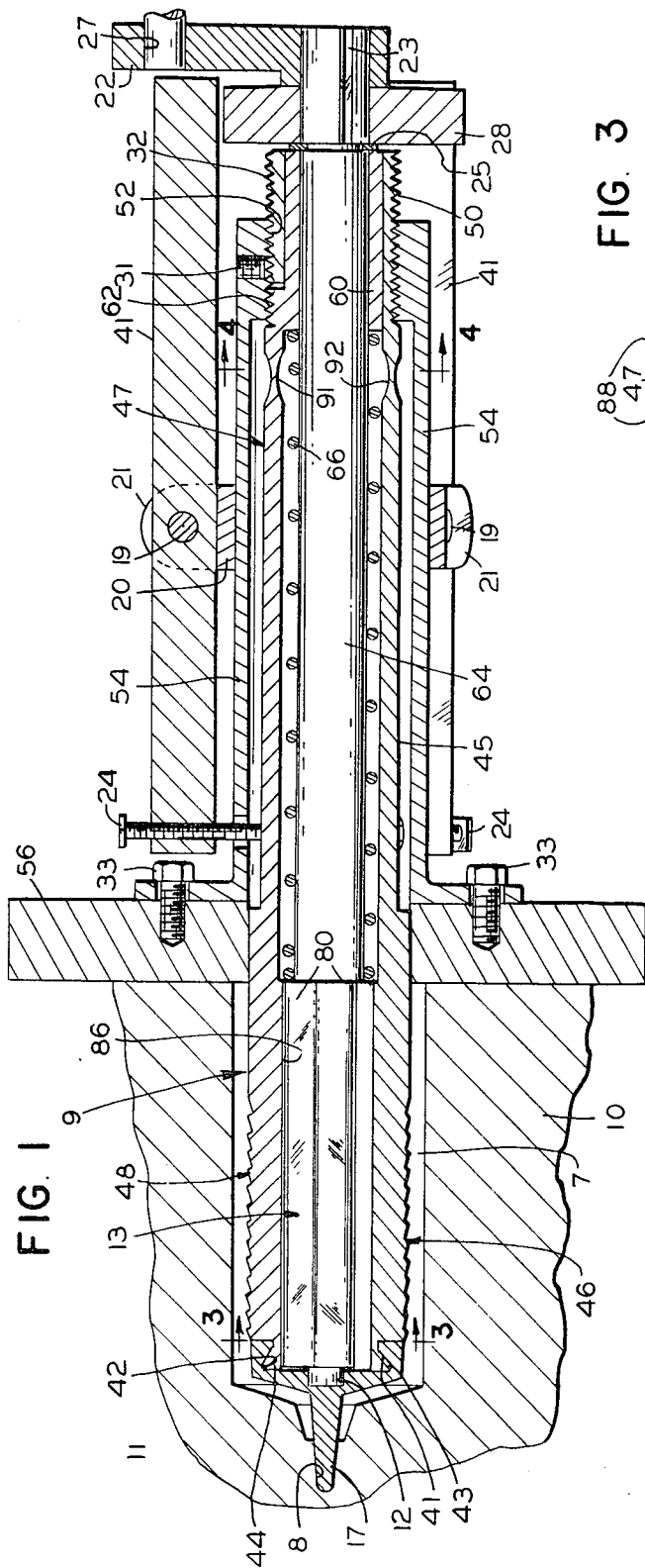
FIG. 1 is a fragmentary, vertical, sectional view of a molding die structure forming one embodiment of the invention.
Figure 3:
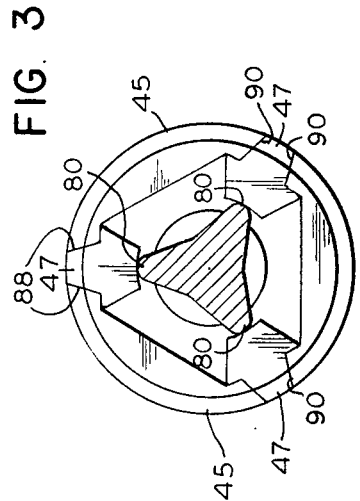
FIG. 3 is an enlarged vertical, sectional view taken along line 3—3 of FIG. 1.

Referring now in detail to the drawings, there is shown therein a molding die structure forming one embodiment of the invention and including an externally threaded, collapsible core 9, an adapter plate 19 and an injection mold 10 having a molding cavity 7 and a pilot pin socket 8. A cap 11 has a pilot pin 17 and an annular, undercut socket 43 which has a frustoconical or camming side wall 41 and an axial bore 42 in the bottom of the socket. The pilot pin 17 is tapered and fits in the socket 8 in the mold. Undercut end portions 43 and 44 of tines 45 of a sleeve 46 and expander ribs or tines 47 of an expander member 48, respectively, fit into the undercut socket 34. The sleeve 46 has an externally threaded end portion 50 screwed into and rigidly locked in a tapped bore 52 in a flanged mounting sleeve 54 by a set screw 31. The flanged mounting sleeve 54 is fastened rigidly to an adapter plate 56 by capscrews 33. A reduced diameter, tubular end portion 60 of the expander member 48 fits closely in the end portion 50 of the sleeve 46 and has threaded end portions 62 on the tines 47, the end portion 60 also being screwed partly into the bore 52 with the threaded end portion 50.

A tri-lobular cam 13 has an end portion 12 journaled in bore 42 and a cylindrical shank portion 64 journaled in the end portion 60 of the sleeve 48. A spring 66 urges the cam toward the left, as viewed in FIG. 1, and a cam 28 and an arm 22 are keyed to the right-hand end portion of the shank portion 64, the arm 22 having a bore 27 for connection to an actuating cylinder device (not shown). A mounting ring 20 having clevis portions 21 is keyed to the mounting sleeve 54 and is fixed rigidly thereto. Pins 19 mount levers 41 pivotally on the ring 20 and adjustment screws 24 are carried by the levers 41.

When the arm 22 is turned 60°, lobes 80 are turned out of engagement with tines 47, and then the cam 28 pivots levers 41 to push the tines 47 radially inwardly out of the spaces between the tines 45 and permit the tines 45 to collapse somewhat in radially inward directions, the tines 45 being biased inwardly to such collapsed positions. This frees the tubular molded part and the adapter plate, and the core can be withdrawn from the tubular molded part having an internal thread molded therein, the adapter plate being selectively movable away from the mold to withdraw the core. To expand the core to molding condition, the arm 22 is turned back 60°. This withdraws the adjustment screws 24 and rotates the lobes 80 into engagement with inwardly projecting cam follower portions 86 of the tines 47 to expand the tines outwardly. Beveled side edge surfaces 88 of the tines 47 engage oppositely beveled side edge surfaces 90 of the tines 45 to push out the tines 45 and form a cylinder therewith. The retainer cap is stepped down in outer diameter relative to the sleeve 45 so that it has clearance to be withdrawn from a molded part 97 (FIG. 5) having internal threads 99. Also, the socket 34 is sufficiently deeply undercut that, even with the tines 45 and 47 fully collapsed, the cap still is interlocked axially with the tines 45.

The expander tines 47 have thin, flexible, flattened pivot portions 91, and the tines 45 have thin, flexible, flattened pivot portions 92. This, plus relieved side edge portions of the shank portions of the tines 45 and 47, provides clearance to permit the tines 45 and 47 to be moved inwardly to collapsed positions even though the shank portions of the tines 47 do not move completely out of the spaces between the shank portions of the tines 45.

For disassembly for maintenance purposes, the arm 22 may be pulled to the right, as viewed in FIG. 1, to pull the cam 13 out from the molding portions of the tines 45 and 47 so that these molding portions can be collapsed further to get the cap 17 off the ends of the tines, and to put the cap back on. The spring 66 serves to return the cam 13 to its normal position when the arm 22 is released.

EMBODIMENT OF FIG. 6

Figure 6:
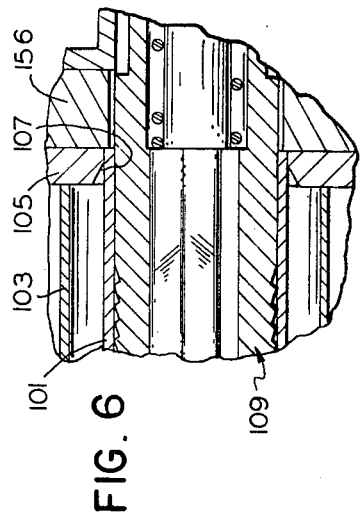
FIG. 6 is a fragmentary, vertical view of a molding die structure forming an alternate embodiment of the invention.

A molding die structure forming an alternate embodiment of the invention and shown in FIG. 6 is similar to that shown in FIGS. 1 to 4 except that the molding die structure of FIG. 6 is a fluid pressure mold adapted to mold a hot, extruded cylinder 101 into the tubular part 97 by air pressure introduced into chamber 103. A sealing plate 105 having a counterbore 107 with a tapered entrance portion fixed to adapter plate 156 receives the end portion of the hot, somewhat soft cylinder 101 in the counterbore, which forms a pressure-tight seal with the cylinder when the core is expanded. The bore in the adapter plate 156 provides some clearance to permit the core to expand. Then, when air under pressure is introduced into the chamber 103 exterior of the cylinder 101, it presses the cylinder onto collapsible core 109 to mold the interior of the cylinder on the core.

The injection mold may be replaced by a fluid pressure mold in which a tube of material to be molded is placed over the core, the mold placed thereover and heat is applied and fluid pressure is applied externally of the tube to press it into molding engagement with the core.

What is claimed is:

1. In a molding structure,
a mold having a generally cylindrical molding cavity open at one end thereof,
an adapter plate movable relative to the mold between a closed position closing said end of the cavity and an open position,
the adapter plate having a bore therethrough aligned with the molding cavity when the adapter plate is in the closed position thereof,
a mounting tube aligned with the bore and having a flanged end secured to the adapter plate and an outer end spaced from the mold,
a first core sleeve having an outer end portion secured to the outer end of the tube and extending through the tube and the bore into the molding cavity,
the portions of the first core sleeve in the cavity, the opening and portions adjacent thereto being slotted longitudinally to define tines movable between outer positions forming portions of a cylinder to inner positions spaced radially inwardly from the outer positions thereof,
a second core sleeve having an outer end portion mounted in the outer end portion of the first core sleeve and extending along the first core sleeve,
the other end portion of the second core sleeve being slotted longitudinally to define tines movable between outer positions between the tines of the first core sleeve when in the outer positions thereof and inner positions spaced inwardly from the tines of the first core sleeve when in the inner positions thereof,
and a cam having a shank portion journaled in the second core sleeve and having lobes movable, when the cam is rotated, from positions pushing the tines to the outer positions thereof to positions permitting movement of the tines to the inner positions thereof.

2. The molding structure of claim 1 including a second cam mounted on the shank portion,
lever means pivotally mounted on the mounting tube and operable by the second cam when the second cam is rotated,
and actuators carried by the lever means for moving the tines from the outer positions thereof to the inner positions thereof.

3. In a collapsible molding core,
a plurality of first elongated core segments mounted in a circle in spaced apart positions and movable between outer positions and inner positions,
a plurality of second elongated core segments,
means mounting the second elongated core segments for movement from outer positions between the first elongated core segments to form a hollow core therewith when the first elongated core segments are in the outer positions thereof and inner positions spaced inwardly from the first elongated core segments when the first elongated core segments are in the inner positions thereof,
and means for moving the second elongated core segments between the inner and outer positions thereof,
the moving means including inner pressing means for moving the core segments to the outer positions thereof and outer pressing means for moving the core segments to the inner portions thereof,
the outer pressing means including a plurality of levers, a plurality of adjustment screws on the levers and cam means for swinging the levers to press the adjustment screws against the core segments to press the core segments inwardly.

* * * * *